US006118430A

United States Patent [19]

Igari

[11] Patent Number: 6,118,430

[45] Date of Patent: Sep. 12, 2000

[54] DISPLAY CONTROLLER FOR REDUCING FLICKER OF A CURSOR USING GRADIATION INFORMATION

[75] Inventor: Shoji Igari, Fukushima-ken, Japan

[73] Assignee: Alps Electric Co., Ltd., Tokyo, Japan

[21] Appl. No.: 09/141,680

[22] Filed: Aug. 27, 1998

[30] Foreign Application Priority Data

Sep. 1, 1997 [JP] Japan .................................... 9-236290

[51] Int. Cl.[7] .............................. G09G 5/08; G09G 3/36; G02F 1/133

[52] U.S. Cl. .......................... 345/145; 345/118; 345/157; 345/162

[58] Field of Search .................................... 345/145, 157, 345/162, 118

[56] References Cited

U.S. PATENT DOCUMENTS 6,028,587 2/2000 Igari ........................................ 345/147

*Primary Examiner*—Mark R. Powell
*Assistant Examiner*—Paul K. Newgen
*Attorney, Agent, or Firm*—Brinks Hofer Gilson & Lione

[57] ABSTRACT

A cursor is displayed clearly without glimmering, in the display control device and the display apparatus which suppress the dissipation currents used in the data transfer to a much lower level, by reducing the quantity of data transfer between the image memory and the display means. The controller 15 calculates a cursor range that is subject to a process of a cursor display. Then, the controller 15 determines a divided area from which the gradation information is to be read, based on the cursor range calculated, and the data of the cache memory 15*a* indicating the divided area into which the information of intermediate gradation is stored in the image data storage unit 3*a*. And then, the controller 15 reads the gradation information from the divided area, and writes the data into the built-in memory 2*a*, based on the cursor range, the gradation information, and the current frame number. The driver 2 turns the correspondence each of the display dots to either the ON state or the OFF state, based on the data of the built-in memory 2*a*.

6 Claims, 6 Drawing Sheets

DISPLAY CONTROLLER FOR REDUCING FLICKER OF A CURSOR USING GRADIATION INFORMATION

BACKGROUND OF THE INVENTION

1. Field of the Invention

The present invention relates to a display control device for controlling a display gradation in each display dot of a liquid crystal display device and the like, based on an image data (gradation data) written into an image memory such as a VRAM and the like, and to a display apparatus having the display control device.

2. Description of the Related Art

FIG. 6 is a block diagram showing a structural example of a conventional display apparatus.

In the figure, a screen size of an liquid crystal display panel (hereinafter, it refers to "LCD panel") 1 is a width 320×a length 240 pixels, and each pixel is constituted of 3 dots such as R (Red), G (Green), and B (Blue).

Also, a storage capacity of an image data storage unit 3*a* which is constituted of an IC memory such as a VRAM and the like, is 320×240×3×4=921,600 bits=115,200 bytes, and as corresponding to each display dot (320×240×3 dots) of the LCD panel 1, the gradation data of 4 bits is allocated thereto, respectively. As a result, in each display dot of the LCD panel 1, 16 gradations, i.e., the gradation displays of (0000) 2~(1111) 2 are made possible. Further, in FIG. 6, two image data storage unit 3*a* are provided for use in a front screen and for use in a back screen since they might perform an image switching process.

A driver 102 drives the corresponding display dots one after another on the LCD panel 1 so as to turn them to be the gradation displays shown by the gradation data, when the gradation data (DA) is inputted from a controller 105 in synchronization with a predetermined clock.

In the configuration as described above, a CPU 4 writes an optional image data (the gradation data for 1 screen) into the image data storage unit 3*a*.

On the other hand, the controller 105 reads, whenever a predetermined frame signal (a pulse signal with an interval of 1/150 seconds) is inputted, the gradation data in the image data storage unit 3*a* from a head address one after another, and then transfers each of the gradation data being read, together with an address thereof, to the driver 102.

The driver 102 drives the display dots corresponding to the transferred addresses so that they would turn to the gradation display indicated by the gradation data transferred therewith.

As the above described processes are repeated whenever the above-mentioned frame signal is inputted, the image corresponding to the image data written into the CPU 4 is displayed on the LCD panel 1.

Meanwhile, in the conventional display apparatus described above, since the controller 105 reads all of the gradation data in the image data storage unit 3*a* whenever the frame signal is inputted, and then transfers all of the gradation data being read to the driver 102, in a case that the image size of the LCD panel 1 is large (for example, in a case of the width 320×the length 240 pixels and the like, as shown in FIG. 6), the quantity of data transfer between the image data storage unit 3*a* and the controller 105, and the one between the controller 105 and the driver 102 turn to be very large.

Accordingly, there was a problem that the dissipation currents used for the data transfers are very large in the conventional apparatus.

For such problem, the applicant of the present invention had filed the Japanese Patent Application No. 9-5874 disclosing the display control device and the display apparatus which reduce the quantity of data transfer between the respective units (the driver, the image data storage unit, and the controller) of the display apparatus, and suppress the dissipation currents to much lower, by providing, inside the driver, a built-in memory which holds a current display content of the LCD panel, as well as by providing a memory which holds a storage location (in the image data storage unit) of the data showing an intermediate gradation (the gradation degree that is larger than 0%, but less than 100%).

Furthermore, in the LCD panel, there is a case that a cursor is also displayed besides the image corresponding to the above mentioned image data.

In this case, in the conventional display apparatus, whenever the frame signal is inputted (i.e., for each frame), the data about the cursor display is transferred to the driver.

For this situation, in the above-mentioned apparatus by the applicant, it is not ensured that all of the gradation data is transferred whenever the frame signal is inputted because of the above mentioned feature (i.e., reducing the quantity of data transfer between the respective units of the display apparatus).

As a result, in the above-mentioned apparatus by the applicant, there is a problem that a cursor can not be displayed clearly without glimmering, by the same processes as the conventional apparatus.

SUMMARY OF THE INVENTION

The present invention was made under such background described as above, and accordingly, it is an object of the present invention to display a cursor clearly without glimmering, in the display control device and the display apparatus which suppress the dissipation currents used in the data transfer to much lower, by reducing the quantity of data transfer between the image memory and the display means.

The present invention is characterized in that, it comprises: a gradation information storage means for storing a gradation information indicating a display gradation of a display dot, corresponding to each of the display dots of a display means which is constituted of a plurality of display dots; an indication information storage means for storing an indication information indicating that said display dot is set to be either the ON state or the OFF state, corresponding to each of said display dots of said display means; an existing/non-existing information storage means for storing an existing/non-existing information indicating a predetermined value, for divided areas that are the areas of which the storage areas of said gradation information storage means are divided into a plurality of areas, when at least one or more of the gradation information stored in each of said divided areas is an intermediate gradation; an existing/non-existing information writing means for writing said existing/non-existing information into said existing/non-existing information storage means, based on the gradation information stored in said gradation information storage means; a counting means for repeatedly counting from a first predetermined number to a second predetermined number; a cursor range calculating means for calculating, in a display unit which is constituted of each of the display dots of said display means, a cursor range which is subject to a process of a cursor display; a divided area determining means for determining a divided area from which said gradation information is to be read, based on said cursor range calculated by said cursor range calculating means, and said existing/ non-existing information stored in said existing/non-existing information storage means; a gradation information reading means for reading and outputting a gradation information from said divided area determined by said divided area determining means; an indication information writing means for writing an indication information into said indication information storage means, based on said cursor range calculated by said cursor range calculating means, said gradation information outputted by said gradation information reading means, and a current number indicated by said counting means; and a flashing means for turning each of said corresponding display dots to either a ON state or a OFF state, based on said indication information stored in said indication information storage means.

As a result, according to the present invention, the existing/non-existing information writing means writes the existing/non-existing information into the existing/non-existing information storage means, based on the gradation information stored in the gradation information storage means. Also, the cursor range calculating means calculates a cursor range which is subject to a process of a cursor display, in the display unit constituted of the respective display dots of the display means. Accordingly, the divided area determining means determines a divided area from which the gradation information is to be read, based on the cursor range calculated by the cursor range calculating means, and the existing/non-existing data stored in the existing/non-existing information storage means, and the gradation information reading means reads and outputs the gradation information from the divided area determined by the divided area determining means. Then, the indication information writing means writes the indication information into the indication information storage means, based on the cursor range calculated by the cursor range calculating means, the gradation information outputted by the gradation information reading means, and the current number indicated by the counting means. The flashing means turns the correspondence each of the display dots to either the ON state or the OFF state, based on the indication information stored in the indication information storage means. Thereby, it can reduce the quantity of data transfer between the image memory and the display means, as well as display a cursor clearly without glimmering.

DESCRIPTION OF THE PREFERRED EMBODIMENTS

In the followings, a preferred embodiment of the present invention will be described with reference to the accompanying drawings.

The configuration/operation of the present embodiment is the same as the configuration/operation of the embodiment described in the patent application (JP9-5874) which is filed by the same applicant prior to the present invention, except the configuration/operation regarding the display/shift of a cursor.

Configuration

Figure 1:
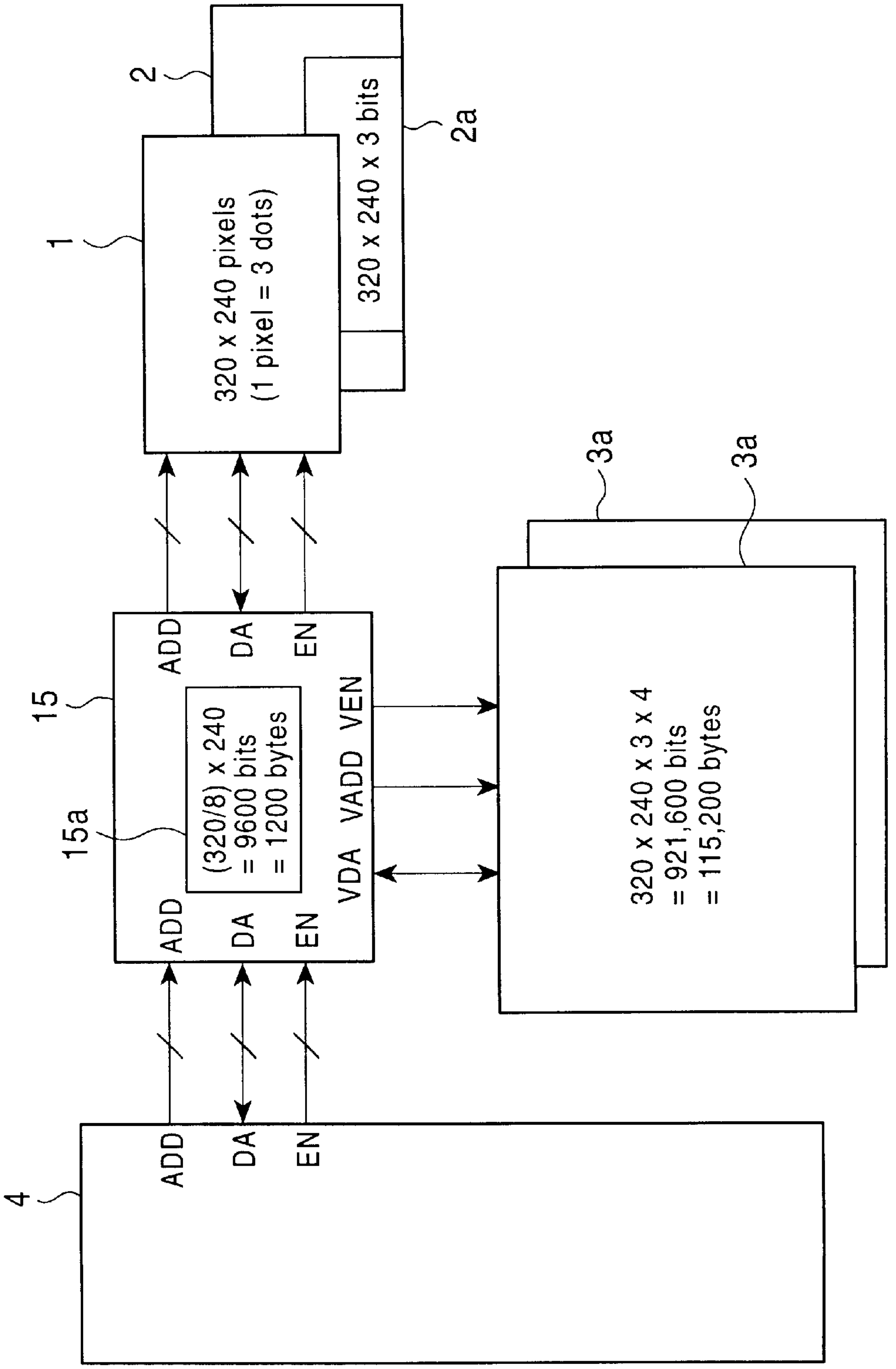
FIG. 1 is a block diagram showing a structural example of the display apparatus in accordance with one embodiment of the present invention.

FIG. 1 is a block diagram showing a structural example of a display apparatus according to one embodiment of the present invention.

Figure 6:
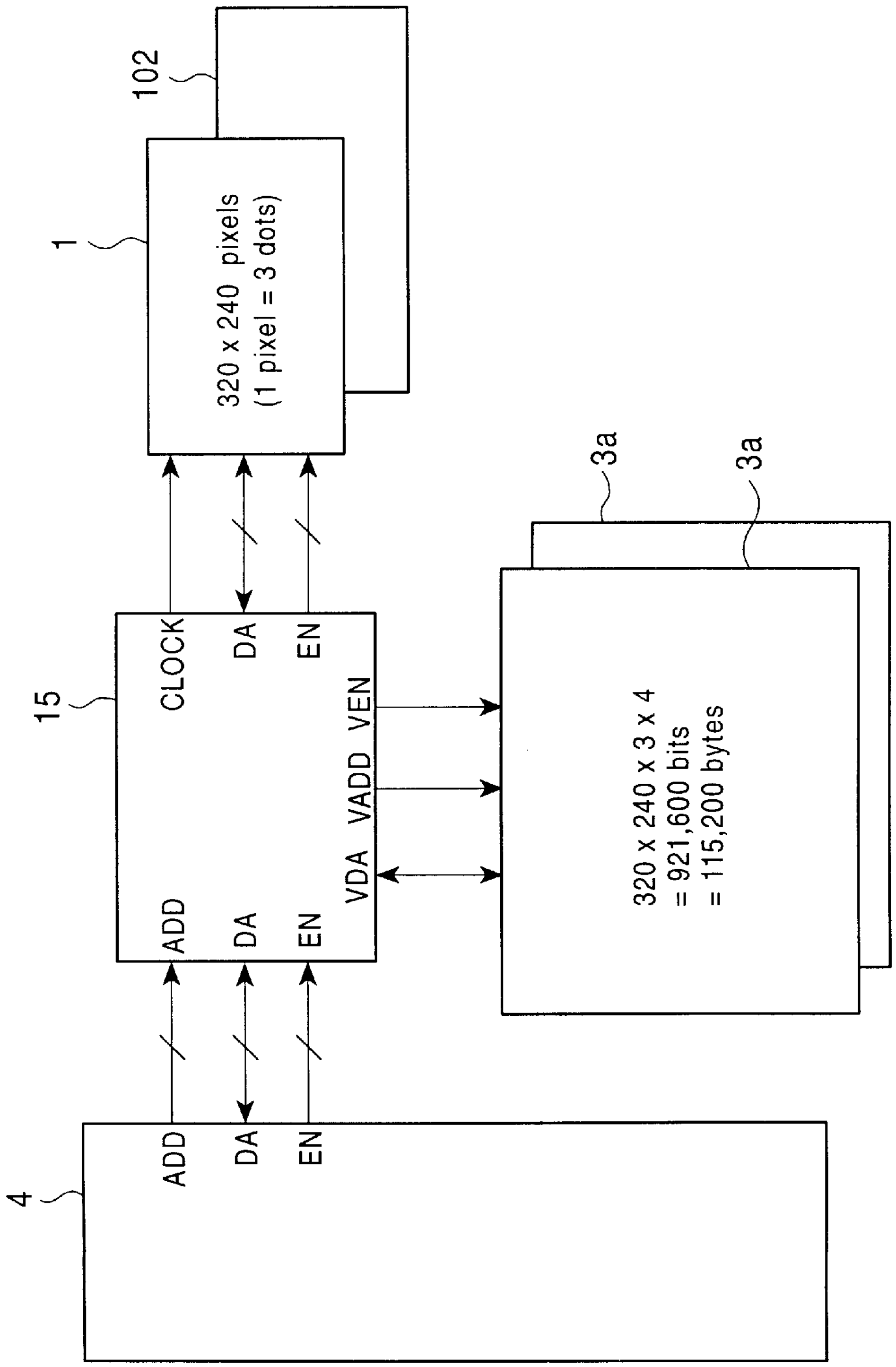
FIG. 6 PRIOR ART
FIG. 6 is a block diagram showing a structural example of the conventional display apparatus.

In the figure, a LCD panel 1 is the same as the one shown in FIG. 6. Further, hereinafter, each pixel in the LCD panel 1 will be designated by the coordinates such as a "pixel (m, n)" (herein, m is an integer of $1 \leqq m \leqq 320$, n is an integer of $1 \leqq n \leqq 240$).

A driver 2 has a built-in memory 2*a*. A storage capacity of the built-in memory 2*a* is 320×240×3=230,400 bits=28,800 bytes, and 1 bit is allocated, respectively, corresponding to each of the display dots (320×240×3 dots) in the LCD panel 1. Then, the driver 2 drives each of the respective display dots in the LCD panel 1 to an ON state or an OFF state, based on the storage content in the built-in memory 2*a*. That is, in the built-in memory 2*a*, the driver 2 turns the display dot to a ON state, if a data (1 bit) corresponding to 1 dot in the LCD panel 1 is $(1)_2$, and turns the display dot to a Off state, if the data is $(0)_2$.

A storage capacity of an image data storage unit 3*a* is 320×240×3×4=921,600 bits=115,200 bytes. In the present embodiment, by allocating 4 bits of the image data storage unit 3*a*, respectively, for each of the display dots (320×240×3 dots) in the LCD panel 1, it makes possible to display 16 gradations, i.e., the gradations of $(0000)_2$~$(1111)_2$ in each display dot.

Further, two of the image data storage units 3*a*, with the same configuration, are provided, and one of them is used for a memory for use in a display (a front screen), and the other is used for a memory for use in a screen rewriting (a back screen). Moreover, the present invention is applicable for a case of the image data storage unit 3*a* being only provided for 1 screen, and/or for a case of the image data storage unit 3 being provided for 3 screens or more.

A CPU 4 writes an optional image data (the gradation data for 1 screen) into the image data storage unit 3*a*, through a controller 15, corresponding to a program and/or an external input.

The controller 15 refreshes the image data storage unit 3*a*, in synchronization with a pulse signal (frame signal) inputted at 1/150 seconds interval, as well as transfers the gradation data stored in the image data storage unit 3*a* to the driver 2. An operation of the controller 15 will be described in detail in the following.

Also, the controller 15 has a refresh flag (1 bit: not shown) at an inside thereof. The CPU 4 turns the refresh flag to $(1)_2$, when the writing of the image data is completed for the image data storage unit 3*a*, so as to inform that fact to the controller 15.

Further, the controller 15 has a cache memory 15*a* at an inside thereof. A storage capacity of the cache memory 15*a* is (320/8)×240=40×240=9600 bits=1200 bytes.

In the present embodiment, each row (320 pixels) of the LCD panel 1 is divided into 40, each for 8 pixels, and each bit (9600 bits) of the cache memory 15*a* is allocated for the respective divided areas of 9600 (=40×240) resulted therefrom. Then, according to an operation of the controller 15, which will be described later, it is written, into the respective bits of the cache memory 15*a*, whether or not there is an intermediate gradation in the divided areas corresponding to the respective bits.

Hereinafter, in the cache memory 15*a*, the data (1 bit) corresponding to the pixels (k, n)~(k+7, n) of the LCD panel 1 is designated by the coordinates such as a "data of a bit coordinate (i, n) (herein, i is an integer $1 \leqq i \leqq 40$, and $k=(i-1)\times 8+1$).

Moreover, the controller 15 possesses two sets of registers (the NEW cursor register, the OLD cursor register) and two flags (the NEW cursor flag, the OLD cursor flag) at an inside thereof.

Figure 2:
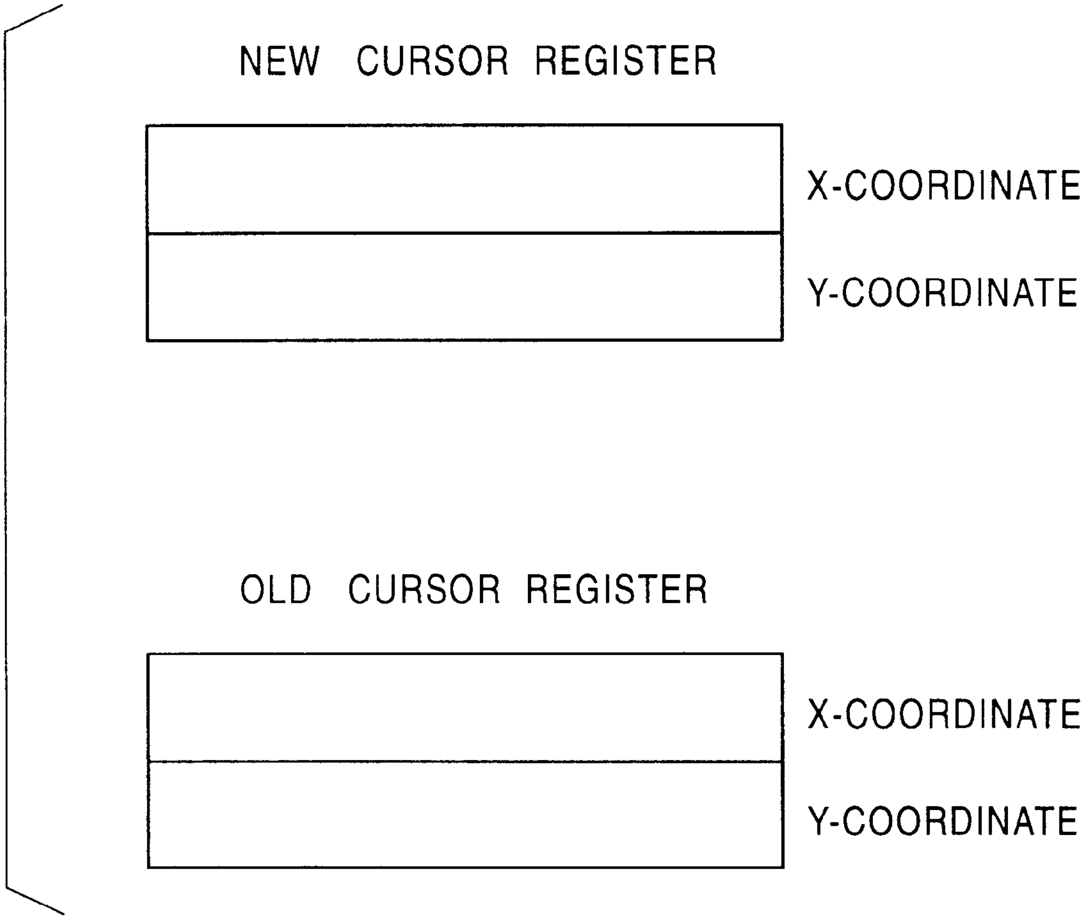
FIG. 2 is an illustrating diagram showing structural examples of the NEW cursor register and the OLD cursor register.

FIG. 2 is an illustrating diagram showing the structural examples of the NEW cursor register and the OLD cursor register.

As shown in the figure, the NEW cursor register is constituted of two registers, and stores a current cursor position (the coordinates at the upper left of the cursor). Also, the OLD cursor register is constituted of two registers, and stores a cursor position before being shifted (the coordinates at the upper left of the cursor).

Further, a size of the cursor has been previously set in the controller 15, and the controller 15 can seek a range of the cursor on the LCD panel 1, if the coordinates at the upper left of the cursor are turned out.

Herein, the NEW cursor flag and the OLD cursor flag are set to (1) 2 when the cursor display is changed according to an operation of a mouse and the like by a user. Then, the NEW cursor flag is returned to (0) 2, when the cursor is written into a new position, by a process of the controller 15, which is to be described later. Also, the OLD cursor flag is returned to (0) 2, when the cursor being displayed at a position before the shift was made is deleted, by a process of the controller 15, which is to be described later.

Operation

Next, an operation of the display apparatus with the above-mentioned configuration will be described.

Display Principle of Gradation

First of all, a display principle of a gradation will be described.

Figure 3A:
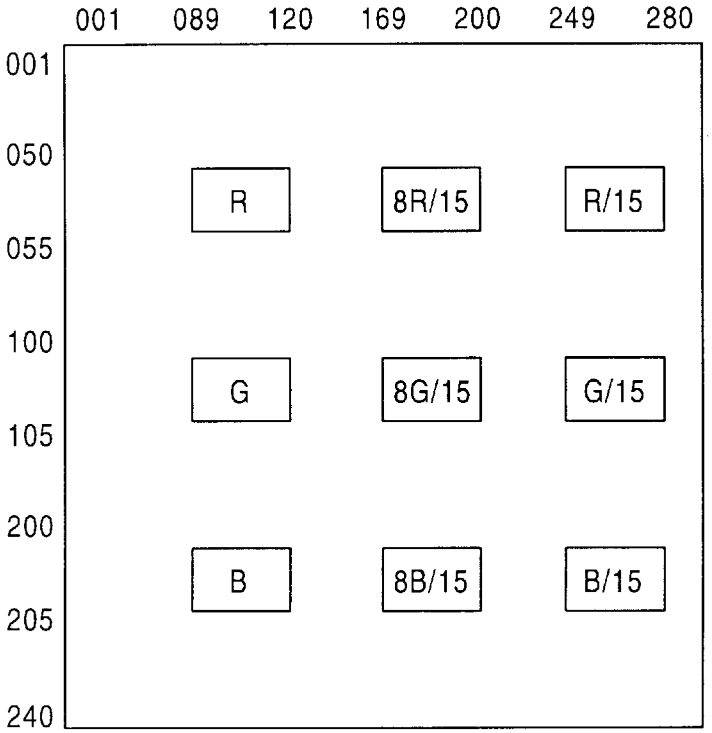
FIG. 3A is an illustrating diagram showing an example of the gradation display of the LCD panel 1.
Figure 3B:
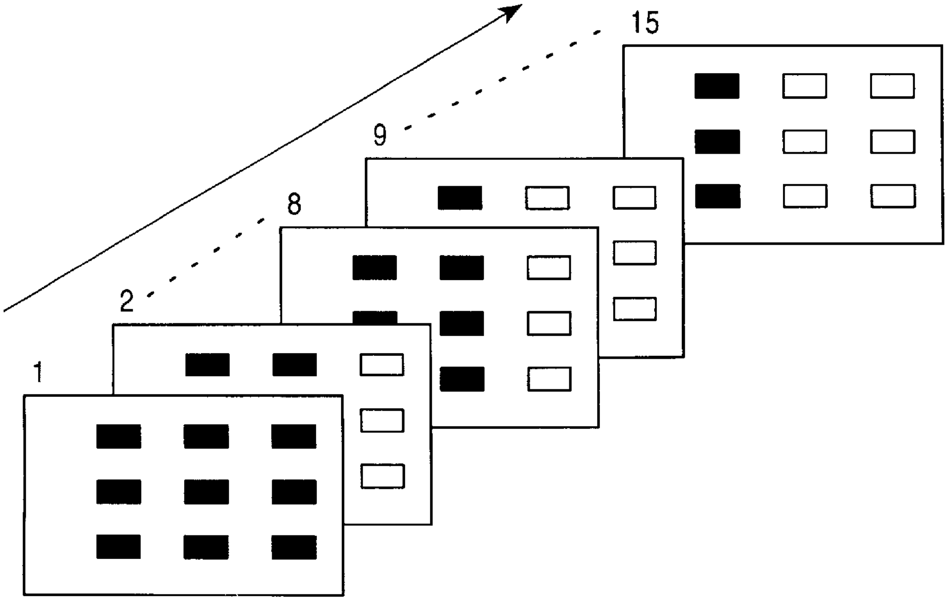
FIG. 3B is an illustrating diagram showing an example of the process in the present embodiment at a time when displaying the gradation display example shown in FIG. 3A.

FIG. 3A is an illustrating diagram showing an example of a gradation display of the LCD panel 1, and FIG. 3B is an illustrating diagram showing a process example in the present embodiment at a time when displaying the gradation display example shown in FIG. 3A.

Herein, the numerals have shown in FIG. 3A indicates the coordinates of the corresponding pixels.

Also, the "R" shown in FIG. 3A indicates that a display area of a rectangular of which the pixel (89, 50) and the pixel (120, 55) are to be the diagonal points thereof is displayed in a red-color with a gradation degree of 100%. Similarly, the "8R/15" indicates that this display area is displayed in a red-color with a gradation degree of $8/15$ (≅53%), and the "R/15" indicates that this display area is displayed in a red-color with a gradation degree of $1/15$ (≅7%), respectively. It is similar for the "G" (display with a green-color) and the "B" (display with a blue-color) shown in FIG. 3A.

On the other hand, each frame (a first frame~a fifteenth frame) shown in FIG. 3B indicates a display state of the LCD panel 1 at a predetermined ultra-short time (concretely, during $1/150$ seconds). In the present embodiment, one display screen is constituted by repeatedly displaying 15 frames, one after another, continuously. At this moment, since 15 frames are displayed one after another at an interval of $1/150$ seconds, 10 screens (one screen is constituted of 15 frames) are displayed for 1 second.

Further, 9 of ■ or □ shown in each frame of FIG. 3B respectively correspond to each of the display areas shown in the same positions in FIG. 3A. Herein, ■ indicates that all display dots within the display area are in the ON state, and □ indicates that all display dots within the display area are in the OFF state.

As shown in this figure, in the present embodiments, one screen is constituted of 15 frames, and the gradation of the display dots in one screen is determined by a ratio of the number of display dots in the ON state to the number of display dots in the OFF state, in 15 frames.

For example, in case of displaying a red-color with the gradation degree of $8/15$ (≅53%), as the display area "R" in FIG. 3A, $15/15$ (=100%), the corresponding display dots are set to be the ON state (■), in all frames, as shown in FIG. 3B.

Further, in case of displaying a red-color with the gradation degree of $8/15$ (≅53%), as the display area "8R/15" in FIG. 3A, the corresponding display dots are set to be the ON state (■), in the first frame~the eighth frame, and the corresponding display dots are set to the OFF state (■), in the ninth frame~the fifteenth frames as shown in FIG. 3B.

Moreover, in case of displaying a red-color with the gradation degree of $1/15$ (≅7%), as the display area "R/15" in FIG. 3A, the corresponding display dots are set to be the ON state (■), in the first frame, and the corresponding display dots are set to the OFF state (□), in the second frame~the fifteenth frame, as shown in FIG. 3B.

Also, as described above, in the present embodiment, since each bit of the built-in memory 2*a* in the driver 2 corresponds to each display dot of the LCD panel 1 one by one, and the storage content of each bit of the built-in memory 2*a*, i.e., (1) 2 or (0) 2 turns to, as it is, a display state (ON state or OFF state) of the display dot corresponding to the LCD panel 1, the gradation display of the 16 gradations can be implemented by rewriting each bit of the built-in memory 2*a* to (1) 2 or (0) 2, in adjusting with the display timing of each frame shown in FIG. 3B.

The ones described above are the display principle of the gradation in the present embodiment.

In the present embodiment, as shown in FIG. 3B, the gradation degree is determined by a ratio of the ON state to the OFF state in 15 frames, and since the driver 2 has the built-in memory 2*a* for storing the states of the display dots, for each display dot, so that in case of the gradation degree of the display dot is either 100% ($15/15$) or 0% ($0/15$), once (1) 2 or (0) 2 is written for the respective bit in the built-in memory 2*a*, then the value is kept, and the display of the gradation degree (100% or 0%) can be kept on, even if no data is supplied from the controller 15*b* thereafter.

On the other hand, since the value (1) 2 or (0) 2 written into the built-in memory 2*a* of the driver 2 is kept until the next value is to be written, even in case of the gradation of the display dot being an intermediate gradation, the ratio of the ON state to the OFF state in 15 frames, i.e., the gradation degree can be determined freely, by writing (0) 2 with the timing (i.e. the frame number) corresponding to the intermediate gradation after having written (1) 2 with the first frame. That is, in the present embodiment, even in case of the gradation of the display dot being an intermediate gradation, the display of the intermediate gradation can be implemented by writing (1) 2 and (0) 2 each once at the maximum in the 15 frames (i.e., during $1/10$ seconds).

As described above, in the present embodiment, in order to express the gradation, it is only necessary to rewrite the stored content of the built-in memory 2*a* in the driver 2, in adjusting with the display timing of each frame (i.e., in synchronization with the frame signal).

Initialization/Renewal of Screen

An operation of implementing an initialization/renewal of a screen will be described hereinafter.

In case of initializing a screen (of the LCD panel 1) immediately after having energized, the CPU 4 writes the image data to be displayed into the one (the memory for use in displaying side) in two of the image data storage units 3*a*, through the controller 15. Then, the CPU 4 makes the refresh flag within the controller 15 to (1) 2 after having written all image data completely.

On the other hand, in case of renewing the screen which is currently displayed, the CPU 4 writes the image data to be displayed into the other one (the memory for use in rewriting the screen side) in two of the image data storage units 3*a*, through the controller 15. Then, the CPU 4 makes the refresh flag within the controller 15 to (1) 2, with an actual screen switching timing, after having written all image data completely. Further, it is possible to write directly the image data to be displayed into the memory for use in displaying side of the image data storage unit 3*a*.

Figure 4:
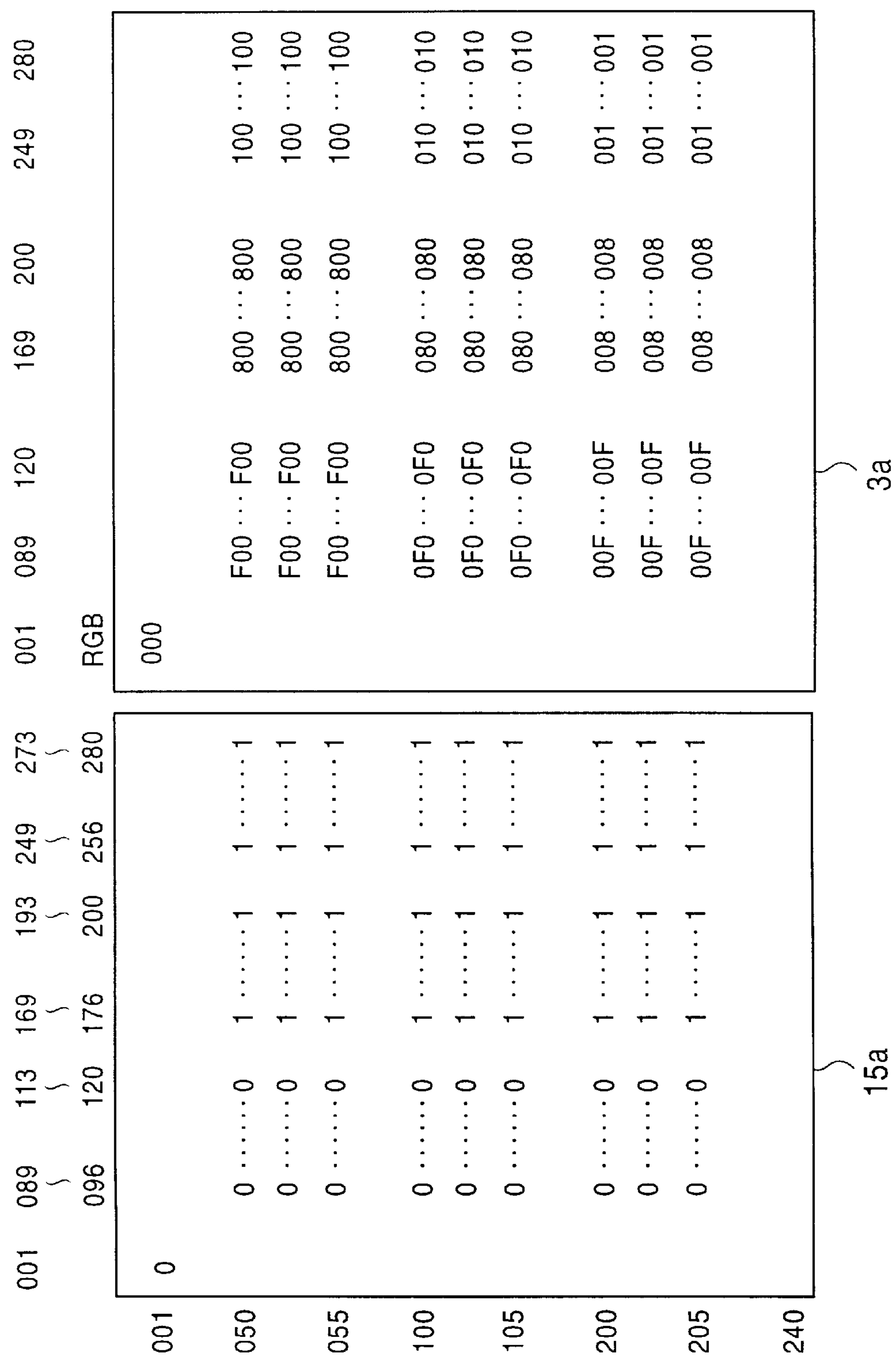
FIG. 4 is an illustrating diagram showing the storage contents of the cache memory 15*a*, and the image data storage unit 3*a;*

FIG. 4 is an illustrating diagram showing the stored content examples of the cache memory 15*a*, the image data storage unit 3*a*. As a concrete example, in case of implementing a display shown in FIG. 3A onto the LCD panel 1, the respective data shown in FIG. 4 are written in correspondence therewith.

In FIG. 4, the numerals lined up around the memory indicate the coordinates of the corresponding pixels. For example, the numerals such as "089~096" indicate that 8 pixels of the coordinates (89, n)~(96, n) on the LCD panel 1 correspond to 1 bit data of the cache memory 15*a*.

In the present embodiment, each row (320 pixels) of the LCD panel 1 is divided into 40, each for 8 pixels, and each bit (9600 bits) of the cache memory 15*a* is allocated for the respective divided areas of 9600 (=40×240) resulted therefrom. On the other hand, a storage capacity of the image data storage unit 3*a* is 320×240×3×4 bits, and thus 4 bits are allocated, corresponding to each display dot (320×240×3 dots) of the LCD panel 1. Accordingly, the corresponding relation of the cache memory 15*a* and the LCD panel 1 is also stood between the cache memory 2*a* and the image data storage unit 3*a* shown in FIG. 4.

When the writing of the image data by the CPU 4 has been completed, and the refresh flag has turned to (1) 2, then the controller 15 performs the following processes, for one frame (assuming that it is the first frame), while the next frame signal is to be inputted (during 1/150 seconds), in synchronization with the frame signal being inputted initially.

Further, as described above, the above-mentioned frame signal is a pulse signal that is inputted at a 1/150-second's interval. Thus, the controller 15 recognizes a current frame number, by repeatedly counting the frame signal, with 15 units (i.e., in the order of 1→2→ . . . →14→15→1→ . . . ).

Herein, the count value is reset only at a time when the screen has been initialized. That is, the above-mentioned count is continued, regardless the renewal of the screen and the display/shift of the cursor (will be described later).

First, the controller 15 reads the gradation data (4 bits data) corresponding to the red-color dot of the pixel (1, 1), from the image data storage unit (hereinafter, it is referred to as "the image data storage unit") on the side of which the image data has been renewed by the CPU 4, in two of the image data storage units 3*a*.

For the example shown in FIG. 4, in the data (000) 16 being stored at the coordinates (001, 001) of the image data storage unit 3a, the "0" at the left end among the three "0" being lined up, corresponds to the gradation data of the red-colored dot of the pixel (1, 1).

Then, in case of the gradation data being (0) 16, the controller 15 transfers (0) 2 for the bit corresponding to the red-colored dot of the built-in memory 2*a*, regardless the current frame number.

Further, in case of the gradation data being (1) 16, the controller 15 transfers (1) 2 for the bit corresponding to the red-colored dot of the built-in memory 2*a*, when the current frame is the first frame, and transfers (0) 2 when the current frame is the second frame the fifteenth frame.

Further, in case of the gradation data being (2) 16~(D) 16, assuming that the gradation data is (p) 16, the controller 15 transfers (1) 2 for the bit corresponding to the red-colored dot of the built-in memory 2*a*, when the frame currently being processing is the first frame~the pth frame, and transfers (0) 2 when the frame currently being processed is the (p+1) frame~the fifteenth frame.

Moreover, in case of the gradation data being (E) 16, the controller 15 transfers (1) 2 for the bit corresponding to the red-colored dot of the built-in memory 2*a*, when the frame currently being processing is the first frame~the fourteenth frame, and transfers (0) 2 when the frame currently being processed is the fifteenth frame.

Also, in case of the gradation data being (F) 16, the controller 15 transfers (1) 2 for the bit corresponding to the red-colored dot of the built-in memory 2*a*, regardless the current frame number.

Further, at a time when transferring the above-mentioned data (1) 2 or (0) 2, an address (the coordinate data on the LCD panel 1) of the gradation data corresponding to the data is also transferred. The driver 2 rewrites the data of corresponding bit to the transfer data (1) 2 or (0) 2 in the built-in memory 2*a*, based on the address.

Next, the controller 15 implements a reading process and a transferring process of the gradation data corresponding to the green dot of the pixel (1, 1), in the similar procedure.

Further the controller 15 implements a reading process and a transferring process of the gradation data corresponding to the blue dot of the pixel (1, 1), in the similar procedure.

Hereinafter, the controller 15 implements a reading process and a transferring process of the gradation data corresponding to each display dot (R, G, B) constituting the pixels, for the remaining pixels on the first row, i.e., the pixels (2, 1)~(320, 1), in the similar procedure.

At this moment, the controller 15 writes (1) 2 into the bits corresponding to the 8 pixels (divided areas) in the cache memory 15*a*, when at least the gradation data corresponding to 1 dot is neither (0) 16 nor (F) 16, among all dots (3×8=24 dots) constituting the 8 pixels, whenever the processes for the 8 pixels have completed, as the 8 pixels, i.e., the pixels (1, 1)~(8, 1), the pixels (9, 1)~(16, 1), the pixels (17, 1)~(24, 1), . . . to be 1 unit, respectively.

For instance, in the example shown in FIG. 4, since all dots constituting the pixels (1, 1)~(8, 1) are such that the gradation data thereof are all (0) 16, in the image data storage unit 3*a*, the controller 15 sets the data of the bit coordinates (1, 1) to be (0) 2 in the cache memory 15*a*.

That completes the processes for the pixel group on the first row, i.e., each pixel of the pixels (1, 1)~(320, 1).

After having completed the processes for the pixel group on the first row, then, the controller 15 implements a reading process and a transferring process of the gradation data corresponding to each display dot (R, G, B) constituting the pixels, for each pixel of the pixel group on the second row, i.e., the pixels (1, 2)~(320, 2), in the similar procedure, as well as implements a writing process into the cache memory 15*a* for every 8 pixels (divided areas).

Hereinafter, the controller 15 implements the similar processes for the pixel groups on the third row~the two hundred fortieth row, one after another. The processes described above complete the initialization/renewal of the screen.

Herein, for example, in the example shown in FIG. 4, since the display dot corresponding to the red-color, among the 3 dots constituting the pixel (169, 50) of the image data storage unit 3*a* is that the gradation data thereof is (8) 16, the controller 15 sets the data (1 bit) of the bit coordinates (22, 50) to be (1) 2, in the cache memory 15*a*. Herein, because 169=(22~1)×8+1, the pixel (169, 50) on the LCD panel 1 corresponds to the bit coordinates (22, 50) of the cache memory 15*a*.

Display/Shift of Cursor

In the following, an operation for implementing a display/shift of a cursor will be described.

Figure 5:
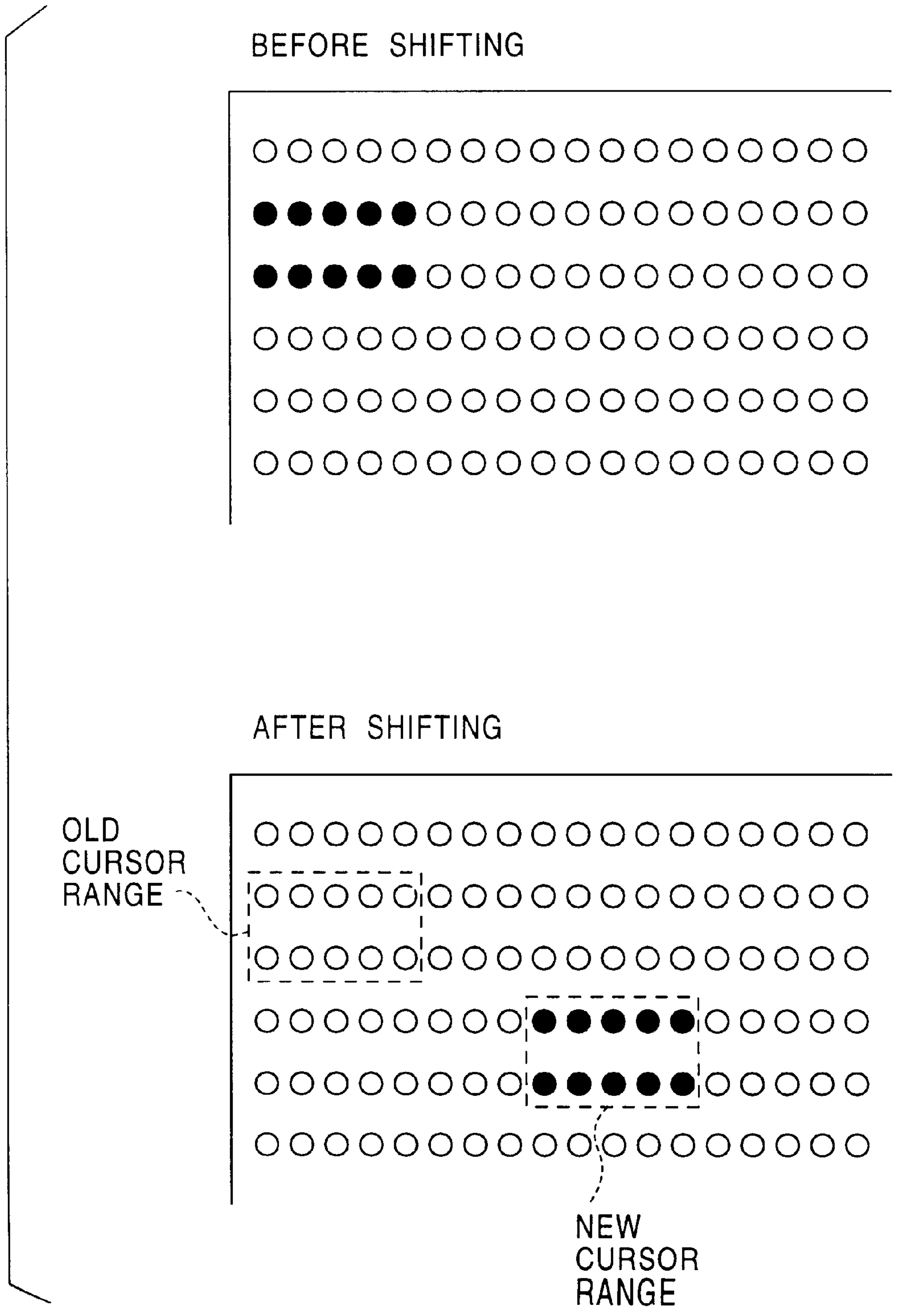
FIG. 5 is an illustrating diagram showing an example of the display/shift of the cursor according to the present embodiment.

FIG. 5 is an illustrating diagram showing an example of a display/shift of a cursor in the present embodiment.

Further, the cursor shown in the figure is a rectangular (5 pixels in width×2 pixels in length), but a size and a shape of a cursor to which the present invention is applied is not limited to that, and the present invention is applicable to a cursor with a variety of sizes and shapes (such as an arrow shape).

In case of implementing a display of a cursor, the CPU 4 writes the coordinates at an upper left of the cursor to be displayed into the NEW cursor register, as well as sets the NEW cursor flag to (1) 2. At that time, the OLD cursor flag is left as (0) 2.

On the other hand, in case of implementing a shift of a cursor which is currently being displayed, the CPU 4 shifts the value of the current NEW cursor register to the OLD cursor register, as well as sets the OLD cursor register to (1) 2. Thereafter, the CPU 4 writes the coordinates at an upper left of the shifted cursor into the NEW cursor register, as well as sets the NEW cursor flag to (1) 2.

As described above, when the NEW cursor flag turned to (1) 2, the controller 15, then, implements the processes described below, for one frame (assuming the t-th frame) while a next frame signal is to be inputted (during 1/150 seconds), in synchronization with the frame signal inputted at the beginning.

First, the controller 15 calculates a range of a cursor to be displayed (hereinafter, it is referred to as the "NEW cursor range"). A calculation of this NEW cursor range is implemented on the basis of the value of the NEW cursor register, and the size of the cursor being previously set in the controller 15.

Next, the controller 15 reads each data (1 bit) ode after another, in the order of the bit coordinates (1, 1), (2, 1), (3, 1), . . . , from the cache memory 15*a*. Herein, it is obvious that the bit coordinates (1, n+1) is to be read following the bit coordinates (40, n).

As described above, in the present embodiment, each row (320 pixels) of the LCD panel 1 is divided into 40, each for 8 pixels, and each bit (9600 bits) of the cache memory 15*a* is allocated for the respective divided areas of 9600 (=40×240) resulted therefrom.

Thus, the controller 15 calculates the coordinates of the 8 pixels corresponding to the data, whenever reading each data (1 bit) from the cache memory 15*a*, and then evaluates whether or not each pixel is within the above-mentioned NEW cursor range.

Then, for the pixels outside the NEW cursor range, the controller 15 implements the processes similar to the ones that will be described later in "[4] Usual time"

On the other hand, for the pixels within the NEW cursor range, the controller 15 transfers (1) 2 to the built-in memory 2*a*, regardless the gradation degrees of the pixels and the current frame numbers, for the respective display dots (R, G, B) constituting the pixels.

Continuing the operations described above, and when the process for the last bit of the cache memory 15*a*, i.e., the bit coordinates (40, 240), the controller 15 returns the NEW cursor flag to (0) 2, and completes the process for the t-th frame.

That is the process when the NEW cursor flag is being (1) 2.

Hereinafter, the controller 15 implements the processes similar to the ones which will be described later in "[4] Usual time" whenever a frame signal is inputted.

However, at that time, the controller 15 stops a transfer of the gradation data to the built-in memory 2*a*, regardless the gradation degree of the pixel, for each pixel within the NEW cursor range.

On the other hand, when the OLD cursor flag turned to (1) 2, the controller 15, then, implements the processes described below, for one frame (assuming the t-th frame) while a next frame signal is to be inputted (during 1/150 seconds), in synchronization with the frame signal inputted at the beginning.

First, the controller 15 calculates a range of a cursor before shifted (hereinafter, it is referred to as the "OLD cursor range"). A calculation of this OLD cursor range is implemented on the basis of the value of the OLD cursor register, and the size of the cursor being previously set in the controller 15.

When the NEW cursor flag and the OLD cursor flag turn to be (1) 2 all together, by the shift of the cursor, then, both of the NEW cursor range and the OLD cursor range are calculated in synchronization with the same frame signal. Herein, when the NEW cursor range and the OLD cursor range are overlapped, then the overlapped range is assumed to be the NEW cursor range.

Next, the controller 15 reads each data (1 bit) one after another, in the order of the bit coordinates (1, 1), (2, 1), (3, 1), . . . , from the cache memory 15*a*. Herein, it is obvious that the bit coordinates (1, n+1) is to be read following the bit coordinates (40, n).

Herein, the controller 15 evaluates whether or not each pixel is within the OLD cursor range, by calculating the coordinates of the 8 pixels corresponding to the data, whenever each data (1 bit) is read from the cache memory 15*a*.

Then, for the pixels outside the OLD cursor range, the controller 15 implements the processes similar to the ones that will be described later in "[4] Usual time"

On the other hand, for the pixels within the OLD cursor range, the controller 15 forcefully turns the data (the data of the cache memory 15*a*) corresponding to the pixel (the 8 pixels including thereof) to (1) 2.

Herein, for example, when the data of the bit coordinates (i, n) of the cache memory 15*a* is forcefully turned to (1) 2, the controller 15 reads the gradation data (4 bits) corresponding to the red-color dots of the pixel ((i−1)×8+1, n), from the image data storage unit 3*a*.

Then, in case of the gradation data being (0) 16, the controller 15 transfers (0) 2 for the bit corresponding to the red-color dot of the built-in memory 2*a*, regardless the current frame number.

Further, in case of the gradation data being (1) 16, the controller 15 transfers (1) 2 for the bit corresponding to the red-colored dot of the built-in memory 2*a*, when the current frame is the first frame, and transfers (0) 2 when the current frame is the second frame~the fifteenth frame.

Further, in case of the gradation data being (2) 16~(D) 16, assuming that the gradation data is (p) 16, the controller 15 transfers (1) 2 for the bit corresponding to the red-colored dot of the built-in memory 2*a*, when the frame currently being processing is the first frame~the pth frame, and transfers (0) 2 when the frame currently being processed is the (p+1) frame~the fifteenth frame.

Moreover, in case of the gradation data being (E) 16, the controller 15 transfers (1) 2 for the bit corresponding to the red-colored dot of the built-in memory 2*a*, when the frame currently being processing is the first frame~the fourteenth frame, and transfers (0) 2 when the frame currently being processed is the fifteenth frame.

Also, in case of the gradation data being (F) 16, the controller 15 transfers (1) 2 for the bit corresponding to the red-colored dot of the built-in memory 2*a*, regardless the current frame number.

Further, at a time when transferring the above-mentioned data (1) 2 or (0) 2, an address (the coordinate data on the LCD panel 1) of the gradation data corresponding to the data is also transferred. The driver 2 rewrites the data of corresponding bit to the transfer data (1) 2 or (0) 2 in the built-in memory 2*a*, based on the address.

Next, the controller 15 reads the gradation data (4 bits) corresponding to the green-color dot of the same pixel from the image data storage unit 3*a*.

Further the controller 15 implements a transferring process similar to the above-mentioned red-color dot for the bit corresponding to the green-color dot of the built-in memory 2*a*.

Finally, the controller 15 reads the gradation data (4 bits) corresponding to the blue-color dot of the same pixel, from the image data storage unit 3*a*.

Then, the controller 15 implements the transfer process similar to the one for the above-mentioned red-color dot, for the bit corresponding to the blue-colored dot of the built-in memory 2*a*.

Hereinafter, the controller 15 implements the reading process of the gradation data described above, for the respective display dots (R, G, B) constituting the pixels ((i−1)×8+2, n)~((i−1)×8+8, n), in the similar procedures, and implements the transferring process of the gradation data, if necessary.

After having completed the process for the pixel ((i−1)×8+8, n), the controller 15 continues the reading process from the cache memory 15*a* again, from the next bit (in this case, the bit coordinates (i+1, n)).

By continuing the above operations, and after having completed the process for the last bit of the cache memory 15*a*, i.e., the bit coordinates (40, 240), the controller 15 returns the OLD cursor flag to (0) 2, and completes the process for the t-th frame.

That is the process when the OLD cursor flag is to be (1) 2.

Usual Time

Next, an operation at a usual time will be described.

Herein, the "usual time" means the cases that the initialization/renewal of the screen and/or the display/shift of the cursor are/is not taking place.

The controller 15 implements this evaluation based on the above-mentioned refresh flag and the cursor register (the NEW cursor register and the OLD cursor register) and the cursor flag (the NEW cursor flag and the OLD cursor flag).

At the usual time, the controller 15 implements a transferring process of an image data described below, for one frame (assuming the t-th frame) while a next frame signal is to be inputted (during 1/150 seconds), in synchronization with the frame signal.

The controller 15, at first, reads the data (1 bit) of each bit, one after another, in the order of the bit coordinates (1, 1), (2, 1), (3, 1), . . . , until (1) 2 is read. Herein, it is obvious that the bit coordinates (1, n+1) is to be read following the bit coordinates (40, n).

Herein, for example, when the data of the bit coordinates (i, n) of the cache memory 15*a* is (1) 2, the controller 15 reads the gradation data (4 bits) corresponding to the red-color dots of the pixel ((i−1)×8+1, n), from the image data storage unit 3*a*.

Then, in case of the gradation data being either (0) 16 or (F) 16, the controller 15 does not implement a transferring process for the bit corresponding to the red-color dot of the built-in memory 2*a*.

Further, in case of the gradation data being (1) 16, the controller 15 transfers (1) 2 for the bit corresponding to the red-colored dot of the built-in memory 2*a*, when the frame being currently in process is the first frame, and transfers (0) 2 when the frame is the second frame, and does not transfer a data when the frame is the third frame~the fifteenth frame.

Further, in case of the gradation data being (2) 16~(D) 16, assuming that the gradation data is (p) 16, the controller 15 transfers (1) 2 for the bit corresponding to the red-colored dot of the built-in memory 2*a*, when the frame currently being processing is the first frame, does not transfer a data when the frame is the second frame~the pth frame, and transfers (0) 2 when the frame is the (p+1) frame~the fifteenth frame.

Moreover, in case of the gradation data being (E) 16, the controller 15 transfers (1) 2 for the bit corresponding to the red-colored dot of the built-in memory 2*a*, when the frame currently being processing is the first frame, does not transfer a data when the frame is the second frame~the fourteenth frame, and transfers (0) 2 when the frame is the fifteenth frame.

Further, at a time when transferring the above-mentioned data (1) 2 or (0) 2, an address (the coordinate data on the LCD panel 1) of the gradation data corresponding to the data is also transferred. The driver 2 rewrites the data of corresponding bit to the transfer data (1) 2 or (0) 2 in the built-in memory 2*a*, based on the address.

Next, the controller 15 reads the gradation data (4 bits) corresponding to the green-color dot of the same pixel from the image data storage unit 3*a*.

Further the controller 15 implements a transferring process similar to the above-mentioned red-color dot for the bit corresponding to the green-color dot of the built-in memory 2*a*.

Finally, the controller 15 reads the gradation data (4 bits) corresponding to the blue-color dot of the same pixel, from the image data storage unit 3*a*.

Then, the controller 15 implements the transfer process similar to the one for the above-mentioned red-color dot, for the bit corresponding to the blue-colored dot of the built-in memory 2*a*.

Hereinafter, the controller 15 implements the reading process of the gradation data described above, for the respective display dots (R, G, B) constituting the pixels ((i−1)×8+2, n)~((i−1)×8+8, n), in the similar procedures, and implements the transferring process of the gradation data, if necessary.

After having completed the process for the pixel ((i−1)×8+8, n), the controller 15 continues the reading process from the cache memory 15*a* again, from the next bit (in this case, the bit coordinates (i+1, n)).

By continuing the above operations, and after having completed the process for the last bit of the cache memory 15*a*, i.e., the bit coordinates (40, 240), the controller 15 completes the process for the t-th frame.

Supplement

Although the embodiments of the present invention have been described as above, with reference to the drawings, a concrete structure is not limited to these embodiments, and the variations in the designs that do not departure from the scope of the present invention will be included in the present invention.

For example, in one embodiment described above, when the NEW cursor flag (and the OLD cursor flag) turns to (1) 2, the display/shift of the cursor is implemented at a time of scanning for one screen which is in synchronization with the next frame signal, but other than this, when the NEW cursor flag (and the OLD cursor flag) turns to (1) 2, it can be thought of implementing the display/shift of the cursor, for a row (i.e., a line of the pixels in the width direction) corresponding to the NEW cursor range (and the OLD cursor range), in synchronization with the next frame signal, and implementing the display/shift of the cursor, for a bldck corresponding to the NEW cursor range (and the OLD cursor range), in synchronization with the next frame signal.

In the following, the correspondence relations between each means described in the claims and the above-mentioned embodiments will be described.

| |
|---|
| gradation information storage means . . . image data storage unit 3a |
| indication information storage means . . . built-in memory 2a |
| existing/non-existing information storage means . . . cache memory 15a |
| existing/non-existing information writing means . . . controller 15 |
| counting means . . . controller 15 |
| cursor range calculating means . . . controller 15 |
| divided area determining means . . . controller 15 |
| gradation information reading means . . . controller 15 |
| designated information writing means . . . controller 15 |
| flashing means . . . driver 2 |
| display means . . . LCD panel 1 |
| gradation information writing means . . . CPU 4 |

As described above, according to the present invention, there is an advantage that a cursor can be displayed clearly without glimmering, in the display control device and the display apparatus which suppress the dissipation currents used in the data transfer to much lower, by reducing the quantity of data transfer between the image memory and the display means.

What is claimed is:

1. A display controlling device, comprising:

a gradation information storage means for storing a gradation information indicating a display gradation of a display dot, corresponding to each of the display dots of a display means that is constituted of a plurality of display dots;

an indication information storage means for storing an indication information indicating that said display dot is set to be either the ON state or the OFF state, corresponding to each of said display dots of said display means;

an existing/non-existing information storage means for storing an existing/non-existing information indicating a predetermined value, for divided areas that are the areas of which the storage areas of said gradation information storage means are divided into a plurality of areas, when at least one or more of the gradation information stored in each of said divided areas is an intermediate gradation;

an existing/non-existing information writing means for writing said existing/non-existing information into said existing/non-existing information storage means, based on the gradation information stored in said gradation information storage means;

a counting means for repeatedly counting from a first predetermined number to a second predetermined number;

a cursor range calculating means for calculating, in a display unit which is constituted of each of the display dots of said display means, a cursor range which is subject to a process of a cursor display;

a divided area determining means for determining a divided area from which said gradation information is to be read, based on said cursor range calculated by said cursor range calculating means, and said existing/non-existing information stored in said existing/non-existing information storage means;

a gradation information reading means for reading and outputting a gradation information from said divided area determined by said divided area determining means;

an indication information writing means for writing an indication information into said indication information storage means, based on said cursor range calculated by said cursor range calculating means, said gradation information outputted by said gradation information reading means, and a current number indicated by said counting means; and a flashing means for turning each of said corresponding display dots to either a ON state or a OFF state, based on said indication information stored in said indication information storage means.

2. A display controlling device according to claim 1, wherein said cursor range calculating means comprises:

a cursor position storage means for storing a cursor position;

a cursor specification storage means for storing a cursor specification; and a calculation means for calculating said cursor range, based on said cursor position and said cursor specification.

3. A display controlling device according to claim 1, wherein at least one or more of said existing/non-existing information writing means, said counting means, said cursor range calculating means, said divided area determining means, said gradation information reading means and said indication information writing means, and said existing/non-existing information storage means are provided in a same integrated circuit.

4. A display controlling device according to claim 1, wherein said display means is, a pixel constituted of a predetermined numbers of display dots being as an unit, constituted of a matrix of pixels; and said divided areas are the areas of which said storage areas of said gradation information storage means are divided as corresponding to a plurality of pixels which constitute each row of said matrix.

5. A display apparatus, comprising:

a display controlling device according to claim 1;

a display means constituted of a plurality of display dots; and a gradation information writing means for writing an optional gradation information into said gradation information storage means.

6. A display apparatus according to claim 5, wherein said display means is a liquid crystal display panel.

* * * * *